US010766493B2

(12) United States Patent
Buburuzan et al.

(10) Patent No.: US 10,766,493 B2
(45) Date of Patent: Sep. 8, 2020

(54) METHOD AND AUTOMATIC CONTROL SYSTEMS FOR DETERMINING A GAP IN TRAFFIC BETWEEN TWO VEHICLES FOR A LANE CHANGE OF A VEHICLE

(71) Applicant: VOLKSWAGEN AKTIENGESELLSCHAFT, Wolfsburg (DE)

(72) Inventors: Teodor Buburuzan, Braunschweig (DE); Monique Engel, Braunschweig (DE); Bernd Rech, Bokensdorf (DE); Stefan Gläser, Braunschweig (DE); Bernd Lehmann, Wolfsburg (DE); Sandra Kleinau, Rötgesbüttel (DE); Hendrik-Jörn Günther, Hannover (DE)

(73) Assignee: VOLKSWAGEN AKTIENGESELLSCHAFT (DE)

( * ) Notice: Subject to any disclaimer, the term of this patent is extended or adjusted under 35 U.S.C. 154(b) by 67 days.

(21) Appl. No.: 15/773,266

(22) PCT Filed: Oct. 18, 2016

(86) PCT No.: PCT/EP2016/074958
§ 371 (c)(1),
(2) Date: May 3, 2018

(87) PCT Pub. No.: WO2017/076636
PCT Pub. Date: May 11, 2017

(65) Prior Publication Data
US 2018/0319403 A1    Nov. 8, 2018

(30) Foreign Application Priority Data

Nov. 4, 2015  (DE) .................. 10 2015 014 142
Mar. 29, 2016  (DE) .................. 10 2016 205 140

(51) Int. Cl.
B60W 30/18    (2012.01)
B62D 15/02    (2006.01)
(Continued)

(52) U.S. Cl.
CPC ...... B60W 30/18163 (2013.01); B60W 50/14 (2013.01); B62D 15/0255 (2013.01);
(Continued)

(58) Field of Classification Search
CPC .................. B60W 30/18163; B60W 50/14
See application file for complete search history.

(56) References Cited

U.S. PATENT DOCUMENTS 7,317,973 B2 * 1/2008 Dieterle ............ B60K 31/0008
                                                    180/167
7,454,291 B2 * 11/2008 Kawakami ........... B62D 15/026
                                                    701/301
(Continued)

FOREIGN PATENT DOCUMENTS

CN    104252796 A    12/2014
CN    104464317 A    3/2015
(Continued)

OTHER PUBLICATIONS

Search Report for International Patent Application No. PCT/EP2016/074958; dated Apr. 10, 2017.
(Continued)

Primary Examiner — Alex C Dunn
(74) Attorney, Agent, or Firm — Barnes & Thornburg LLP

(57) ABSTRACT

Methods and vehicle-to-vehicle communication systems for determining a gap in traffic between two transportation vehicles for a lane change of a transportation vehicle. The method includes identifying the gap in traffic based on a first detection operation and based on a second detection opera-
(Continued)

tion. The first detection operation is based on at least one vehicle-to-vehicle status message of at least one other transportation vehicle. The second detection operation is based on an on-board sensor system of the transportation vehicle.

12 Claims, 7 Drawing Sheets

(51) Int. Cl.
  *G08G 1/16* (2006.01)
  *B60W 50/14* (2020.01)
  *G05D 1/00* (2006.01)
  *G06K 9/00* (2006.01)

(52) U.S. Cl.
  CPC ....... *G05D 1/0088* (2013.01); *G06K 9/00791* (2013.01); *G08G 1/161* (2013.01); *G08G 1/162* (2013.01); *G08G 1/163* (2013.01); *G08G 1/167* (2013.01); *B60W 2050/146* (2013.01); *B60W 2554/00* (2020.02); *B60W 2554/801* (2020.02); *B60W 2556/65* (2020.02); *G05D 2201/0213* (2013.01)

(56) References Cited

U.S. PATENT DOCUMENTS

| | | | | |
|---|---|---|---|---|
| 7,519,457 | B2 * | 4/2009 | Hasegawa | G05D 1/0212 |
| | | | | 701/23 |
| 8,352,112 | B2 * | 1/2013 | Mudalige | G08G 1/22 |
| | | | | 340/435 |
| 8,473,118 | B2 * | 6/2013 | Gottifredi | G01S 5/0289 |
| | | | | 700/65 |
| 9,053,636 | B2 * | 6/2015 | Gordon | G08G 1/096775 |
| 2010/0256835 | A1 * | 10/2010 | Mudalige | G08G 1/163 |
| | | | | 701/2 |
| 2012/0068858 | A1 * | 3/2012 | Fredkin | G08G 1/096741 |
| | | | | 340/902 |
| 2013/0099911 | A1 | 4/2013 | Mudalige et al. | |
| 2018/0322782 | A1 * | 11/2018 | Engel | G08G 1/096741 |

FOREIGN PATENT DOCUMENTS

| | | |
|---|---|---|
| CN | 104504902 A | 4/2015 |
| DE | 102009027535 A1 | 1/2011 |
| DE | 102012218935 A1 | 4/2013 |
| DE | 102012023107 A1 | 6/2014 |
| JP | H07334790 A | 12/1995 |
| JP | 2007153031 A | 6/2007 |
| JP | 2009230377 A | 10/2009 |
| WO | 2012160590 A1 | 7/2014 |

OTHER PUBLICATIONS

Office Action for Korean Patent Application No. 10-2018-7013188; dated Nov. 24, 2019.
Office Action for Chinese Patent Application No. 201680064524.4; dated Jun. 22, 2020.

* cited by examiner

METHOD AND AUTOMATIC CONTROL SYSTEMS FOR DETERMINING A GAP IN TRAFFIC BETWEEN TWO VEHICLES FOR A LANE CHANGE OF A VEHICLE

PRIORITY CLAIM

This patent application is a U.S. National Phase of International Patent Application No. PCT/EP2016/074958, filed 18 Oct. 2016, which claims priority to German Patent Application Nos. 10 2015 014 142.2, filed 4 Nov. 2015, and 10 2016 205 140.7, filed 29 Mar. 2016, the disclosures of which are incorporated herein by reference in their entireties.

SUMMARY

Illustrative embodiments relate to methods and control systems for determining a gap in traffic between two transportation vehicles for a lane change of a transportation vehicle, more precisely, but not exclusively, based on using vehicle-to-vehicle messages and sensor data for the purpose of determining the gap in traffic.

BRIEF DESCRIPTION OF THE DRAWINGS

Disclosed embodiments are described in more detail below with reference to the drawings, but to which there is generally no restriction overall. In the drawings.

DETAILED DESCRIPTION

Figure 1:
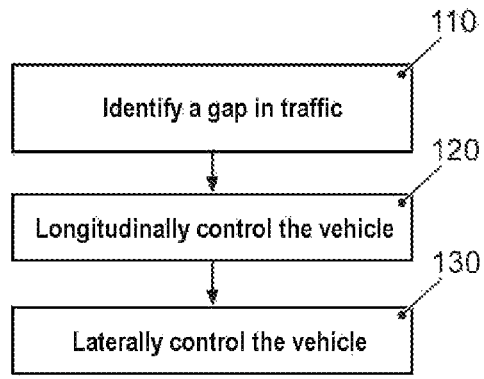
FIG. 1 illustrates a flowchart of an exemplary embodiment of a method for determining a gap in traffic between two transportation vehicles for a lane change of a transportation vehicle.

Vehicle-to-vehicle communication (also called Car2Car, C2C, or Vehicle2Vehicle, V2V) and vehicle-to-infrastructure communication (also called Car2Infrastructure, C2I, or Vehicle2Roadside, V2R) are a focal point of automotive research in the 21st century. Communication between transportation vehicles or between transportation vehicles and the traffic infrastructure enables a multiplicity of new possibilities, for example, coordination of transportation vehicles or communication of transportation vehicles with the traffic infrastructure, for example, to provide the transportation vehicles with traffic jam warnings. In this case, transportation vehicles which are designed for C2C or C2I (also combined under vehicle-to-X communication, Car2X, C2X, or Vehicle2X, V2X) have a transmitting and receiving unit to be able to communicate with other transportation vehicles, for example, via direct radio connections or mobile radio networks. In this case, communication between transportation vehicles or between transportation vehicles and the traffic infrastructure may be limited within a radius of a few hundred meters, for example.

Coordination of transportation vehicles, for example, for cooperatively carrying out driving maneuvers or for the coordination of automated transportation vehicles, is often dependent on an availability of messages from the cooperating transportation vehicles and on a quality of the data. If transportation vehicles are not equipped with vehicle-to-vehicle communication systems, they are often not included in cooperative driving situations.

The patent application DE 10 2012 023 107 A1 shows a method for operating a driving assistance system of a motorized transportation vehicle. In this case, a gap which is suitable for merging into a lane is identified by a motorized transportation vehicle and a speed which makes it possible to merge into the gap is calculated. This speed is displayed to the driver of the motorized transportation vehicle or alternatively the transportation vehicle is directly operated at this speed.

There is the need for an improved concept for supporting cooperative driving functions. The methods and control systems according to the independent claims take this need into account.

Exemplary embodiments provide a method for automatically determining a gap in traffic for the lane change of a transportation vehicle. The transportation vehicle or a vehicle-to-vehicle communication system of the transportation vehicle may be designed to use both vehicle-to-vehicle messages and local sensors for the purpose of determining gaps in traffic. By combining the data, the transportation vehicle can capture both transportation vehicles which are equipped with a vehicle-to-vehicle communication system and transportation vehicles without a vehicle-to-vehicle communication system or obstacles and, on the basis thereof, can carry out or support a lane change in an automated manner. If there is no gap, the method can provide transportation vehicles in a surrounding area with driving intention messages in some exemplary embodiments so that the transportation vehicles create a gap.

Exemplary embodiments provide a method for determining a gap in traffic between two transportation vehicles for a lane change of a transportation vehicle. In some exemplary embodiments, the method can be carried out in an automated manner. The method comprises identifying the gap in traffic based on a first detection process and based on a second detection process. The first detection process is based on at least one vehicle-to-vehicle status message from at least one further transportation vehicle. The second detection process is based on an on-board sensor system of the transportation vehicle. The use of the vehicle-to-vehicle status message and the on-board sensor system makes it possible to determine the gap in traffic in a heterogeneous traffic situation from transportation vehicles designed for vehicle-to-vehicle communication and from transportation vehicles without a vehicle-to-vehicle interface and to detect interfering bodies.

In some exemplary embodiments, the at least one vehicle-to-vehicle status message can comprise information relating to a position and/or a trajectory of the at least one further transportation vehicle. The first detection process can be based on the information relating to the position and/or the trajectory of the at least one further transportation vehicle. The use of the position or trajectory makes it possible to calculate a position map of transportation vehicles in an area surrounding the transportation vehicle.

In some exemplary embodiments, the identification process can also be based on a third detection process. The third detection process can be based on vehicle-to-vehicle messages containing environmental information from the at least one further transportation vehicle. The environmental information can be based on sensor recordings of an environment of the at least one further transportation vehicle by at least one on-board sensor of the at least one further transportation vehicle. Use of the environmental information from the at least one further transportation vehicle makes it possible to increase a virtual coverage range of the sensor perception which can be used for the purpose of detecting the gap in traffic.

In at least some exemplary embodiments, the method can also comprise longitudinally controlling the transportation vehicle parallel to the identified gap in traffic. Alternatively or additionally, the method can also comprise laterally controlling the transportation vehicle by a lane change parallel to the identified gap in traffic. The longitudinal control makes it possible to position the transportation vehicle parallel to the identified gap in traffic and can relieve the load on a driver of the transportation vehicle, for example, and can increase traffic safety. The lateral control enables the lane change and can likewise relieve the load on the driver of the transportation vehicle and can increase traffic safety.

In some exemplary embodiments, the longitudinal control can correspond to controlling a speed or a position of the transportation vehicle in the direction of travel. The longitudinal control can comprise, for example, providing a speed/time profile for an adaptive cruise control system. Alternatively or additionally, the longitudinal control can comprise displaying a longitudinal control aid for a driver of the transportation vehicle. Alternatively or additionally, if the transportation vehicle corresponds to an automatically moving transportation vehicle, the longitudinal control can correspond to longitudinally controlling the automatically moving transportation vehicle on the basis of the identified gap in traffic. The longitudinal control makes it possible to position the transportation vehicle parallel and adjacent to the identified gap in traffic, for example, in a lane which runs parallel to the lane of the gap in traffic. The use of an adaptive cruise control system makes it possible to relieve the load on a driver and can make it possible to assume a position which can be used to move into a lane or merge. The practice of displaying the longitudinal control aid can make it possible for a driver of a transportation vehicle which is not equipped with an adaptive cruise control system to use the assistance of the method. The longitudinal control of the automatically moving transportation vehicle can also relieve the load on the driver and can enable automatic moving in merging situations.

In some exemplary embodiments, the lateral control can correspond to controlling a position of the transportation vehicle transversely with respect to the direction of travel. For example, the lateral control can be carried out when the longitudinal control has positioned the transportation vehicle parallel to the identified gap in traffic. The lateral control can comprise, for example, a driver-initiated automated lane change. Alternatively or additionally, the lateral control can comprise displaying a lateral control aid for a driver of the transportation vehicle. Alternatively or additionally, if the transportation vehicle corresponds to an automatically moving transportation vehicle, the lateral control can correspond to laterally controlling the automatically moving transportation vehicle. The lateral control enables a lane change and makes it possible for the transportation vehicle to merge or move into the identified gap in traffic. The use of the driver-initiated automatic lane change makes it possible to relieve the load on a driver and may enable a semi-automated lane change operation. The practice of displaying the lateral control aid can make it possible for a driver of a transportation vehicle which is not equipped with an adaptive cruise control system to use the assistance of the method. The lateral control of the automatically moving transportation vehicle can also relieve the load on the driver and can enable automatic moving in lane change situations.

In some exemplary embodiments, the method can also comprise determining a driving intention of a driver of the transportation vehicle with respect to the lane change, for instance, merging, and/or ascertaining that the identification process does not identify a gap in traffic. The method can also comprise transmitting a driving intention message based on the detection of the intention and/or the detection that the identification process does not identify a gap in traffic. The driving intention message can comprise an item of information relating to a future lane change request of the transportation vehicle. The practice of providing the driving intention message may enable cooperation of transportation vehicles to enable or simplify a lane change operation.

Exemplary embodiments also provide a method for a transportation vehicle. The method comprises receiving a driving intention message containing a lane change request from a requesting transportation vehicle. The method also comprises ascertaining an item of information relating to cooperation in a cooperative driving maneuver with the requesting transportation vehicle. The information relating to the cooperation indicates whether the transportation vehicle is possible as a cooperation partner and whether a cooperative behavior is possible taking into account the traffic situation based on the driving intention message. The method also comprises determining information relating to a driving maneuver. The process of determining the information relating to the driving maneuver comprises ascertaining information relating to at least one distance to a leading transportation vehicle and/or a trailing transportation vehicle to make it possible to calculate whether the lane change request can be complied with in a possible cooperation area. The process of determining the information relating to the driving maneuver also comprises ascertaining performance of the driving maneuver based on the information relating to the driving maneuver, the information relating to the at least one distance, a speed of the transportation vehicle and a distance to the possible cooperation area. The process of determining the information relating to the driving maneuver also comprises calculating whether the driving maneuver is possible taking into account the traffic situation. The method also comprises providing driving assistance to perform the driving maneuver. The method enables cooperative driving maneuvers if the further transportation vehicle wishes to merge or move into a lane, for example, in the case of an on-ramp onto a road or in the case of an overtaking operation.

In some exemplary embodiments, the process of providing the driving assistance can correspond to automated or semi-automated performance of the driving maneuver. Alternatively or additionally, the process of providing the driving assistance can correspond to a process of providing advice for carrying out the driving maneuver for a driver of the transportation vehicle via a human-machine interface. The automated performance of the driving maneuver may relieve the load on the driver and may enable calculable performance of the driving maneuver. The practice of providing the driving assistance makes it possible to use the method in transportation vehicles which do not move in an automated manner.

In at least some exemplary embodiments, the method can also comprise interchanging vehicle-to-vehicle coordination messages for coordinating the cooperative driving maneuver with at least one further transportation vehicle. The process of providing the driving assistance may also comprise providing a message relating to an acceptance of the lane change request for the requesting transportation vehicle and the at least one further transportation vehicle. Alternatively or additionally, if a message relating to an acceptance of the lane change request is received from the at least one further transportation vehicle, the ascertaining process, the determining process and/or the providing process can be aborted. The use of coordination messages may prevent a multiplicity of transportation vehicles from (futilely) attempting to create the gap in traffic by a driving maneuver.

Exemplary embodiments also provide a control system for a transportation vehicle, designed to identify the gap in traffic between two transportation vehicles based on a first detection process and based on a second detection process. The first detection process is based on at least one vehicle-to-vehicle status message from at least one further transportation vehicle. The second detection process is based on an on-board sensor system of the transportation vehicle. The vehicle-to-vehicle communication system is also designed to longitudinally control the transportation vehicle parallel to the identified gap. The vehicle-to-vehicle communication system is also designed to laterally control the transportation vehicle by a lane change parallel to the identified gap.

Exemplary embodiments also provide a broad control system for a transportation vehicle, designed to receive a driving intention message containing a lane change request from a requesting transportation vehicle. The vehicle-to-vehicle communication system is also designed to ascertain an item of information relating to cooperation in a cooperative driving maneuver with the requesting transportation vehicle. The information relating to the cooperation indicates whether the transportation vehicle is possible as a cooperation partner and whether a cooperative behavior is possible taking into account the traffic situation based on the driving intention message. The vehicle-to-vehicle communication system is also designed to determine information relating to a driving maneuver. The process of determining the information relating to the driving maneuver comprises ascertaining information relating to at least one distance to a leading transportation vehicle and/or a trailing transportation vehicle to make it possible to calculate whether the lane change request can be complied with in a possible cooperation area. The process of determining the information relating to the driving maneuver also comprises ascertaining performance of the driving maneuver based on the information relating to the driving maneuver, the information relating to the at least one distance, a speed of the transportation vehicle and a distance to the possible cooperation area. The process of determining the information relating to the driving maneuver also comprises calculating whether the driving maneuver is possible taking into account the traffic situation. The vehicle-to-vehicle communication system is also designed to provide driving assistance to perform the driving maneuver.

Exemplary embodiments also provide a transportation vehicle comprising at least one of the control systems. Exemplary embodiments also provide a program having a program code for carrying out at least one of the methods when the program code is executed on a computer, a processor, a control module or a programmable hardware component.

Various exemplary embodiments are now described in more detail with reference to the accompanying drawings which illustrate some exemplary embodiments. In the figures, the thickness dimensions of lines, layers and/or areas may be represented in an exaggerated manner for the sake of clarity.

In the following description of the accompanying figures which show only some exemplary embodiments, identical reference symbols can denote identical or comparable components. Furthermore, collective reference symbols can be used for components and objects that occur repeatedly in an exemplary embodiment or in a drawing but are described together with regard to one or more features. Components or objects that are described by identical or collective reference symbols may be configured in the same way, but possibly also differently, with regard to individual, multiple or all features, for example, the dimensions thereof, unless the description explicitly or implicitly reveals otherwise.

Although exemplary embodiments can be modified and altered in different ways, exemplary embodiments are represented as examples in the figures and are described in detail here. However, it should be clarified that the intention is not to limit exemplary embodiments to the respectively disclosed forms, but rather that exemplary embodiments are instead intended to cover all functional and/or structural modifications, equivalents and alternatives that come within the scope of the disclosure. Identical reference symbols denote identical or similar elements throughout the description of the figures.

It should be noted that an element which is referred to as being "connected" or "coupled" to another element may be directly connected or coupled to the other element or there may be elements in between. In contrast, if an element is referred to as being "directly connected" or "directly coupled" to another element, there are no elements in between. Other terms which are used to describe the relationship between elements should be interpreted in a similar manner (for example, "between" in comparison with "directly in between", "adjacent" in comparison with "directly adjacent" etc.).

The terminology that is used here serves only to describe exemplary embodiments and is not intended to limit the exemplary embodiments. As used here, the singular forms "a" and "the" are also intended to include the plural forms unless the context clearly indicates otherwise. Furthermore, it should be clarified that the expressions such as "includes", "including", "has", "comprises", "comprising" and/or "having", as used here, indicate the presence of cited features, whole numbers, operations, workflows, elements and/or components, but do not exclude the presence or addition of one or more features, whole numbers, operations, workflows, elements, components and/or groups thereof.

Unless defined otherwise, all terms used here (including technical and scientific terms) have the same meaning as attributed to them by a person of average skill in the art in the field to which the exemplary embodiments belong. Furthermore, it should be clarified that expressions, for example, those that are defined in generally used dictionaries, should be interpreted as though they had the meaning that is consistent with their meaning in the context of the relevant art, and should not be interpreted in an idealized or excessively formal sense, unless this is expressly defined here.

To improve a flow of traffic, avoid traffic accidents and increase the driving comfort, cooperative driving functions can be used in exemplary embodiments. The V2X technology which enables direct or indirect (by a base station) communication between transportation vehicles is used in this case. As a result of status, environmental and intention information relating to a transportation vehicle being communicated, there is the potential to implement novel safety and comfort functions.

At least some exemplary embodiments relate to a cooperative driving function which makes it possible to merge onto a highway or into free gaps when moving into a lane and/or enables a lane change with cooperative driving. Exemplary embodiments may constitute an improvement in a cooperative ACC system. During the lane change, when merging onto the highway or when moving into free gaps, exemplary embodiments may increase comfort by automatically adapting the longitudinal control to a selected gap. A gap can be detected early with the V2X technology and therefore the communication of the above-mentioned information.

Cooperative driving denotes a behavior in road traffic in which the road users enable, facilitate or assist with mutually planned maneuvers by suitably adapting their own driving behavior. Cooperation can take place between different types of transportation vehicles (transportation vehicles, commercial transportation vehicles, two-wheeled transportation vehicles etc.). This description describes a cooperative driving function, which enables cooperative lane changing, using the example of the cooperative lane change on a highway. The concept is generally valid for lane changes and can be applied to situations such as lane changes before the end of a lane, before a lane closure, before a lane restriction, on account of a planned route etc.

In the case of so-called "cooperative merging" or a "cooperative lane change", two different transportation vehicle roles in the road traffic can be defined: that of the road user asking for or requesting cooperation during the lane change or requesting cooperation (Request) and that of the road user complying with the request or accepting the request (Accept). The processes of requesting and accepting can be explicitly affected by interchanging corresponding messages or can be implicitly affected on the basis of an analysis of the situation. In the example of driving onto a highway, the request transportation vehicle is that transportation vehicle which is in the merging/acceleration lane. The accept transportation vehicle is moving on the highway in the lane into which merging is intended to be carried out.

In the role of the request transportation vehicle, the function can be subdivided into three different phases:

1. Find a suitable gap (perception),
2. Approach the suitable gap or control the transportation vehicle to the gap (longitudinal control),
3. Carry out a lane change into the gap (lateral control).

The three different phases are based on different technologies. The first phase is the perception phase which can correspond to a method operation at 110 from FIG. 1. By on-board sensor information and received environmental and status information (for example, positions and speeds of V2X transportation vehicles and their distances to other transportation vehicles), for example, the transportation vehicle generates its own model of the transportation vehicle environment and thus identifies a suitable gap between two transportation vehicles.

The second and third phases may be actuator-based, for example. In the second phase, the transportation vehicle is positioned parallel to the targeted gap, for example. The second phase may comprise or correspond to method operation at 120 from FIG. 1, for example. This maneuver can be performed either by the driver with the assistance of a suitable HMI (Human-Machine Interface), for example, or can be carried out in an automated manner, for example. In practice, the automated adaptation of the transportation vehicle speed may be desired for reasons of the stress on the driver. In this case, the parameters of an ACC system could be automatically adapted in a suitable manner, for example. In the third phase which can correspond to method operation at 130 from FIG. 1, it is then possible to merge into the selected gap using the lateral control. This third phase can be carried out in an automated manner again or manually depending on the degree of automation.

Figure 1A:
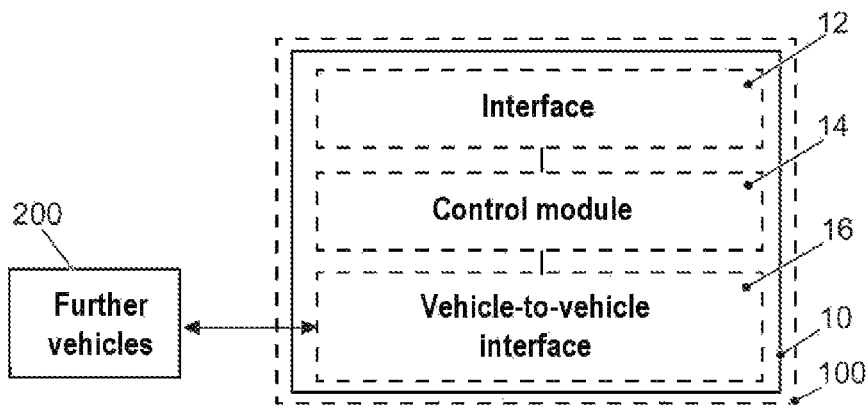
FIG. 1a shows a block diagram of an exemplary embodiment of a control system for determining a gap in traffic between two transportation vehicles for a lane change of a transportation vehicle.
Figure 1B:
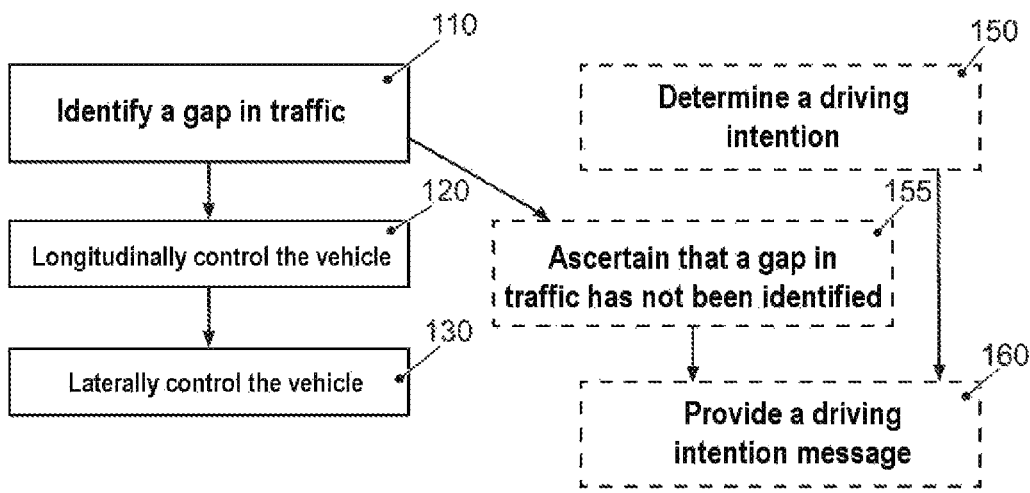
FIG. 1b illustrates a flowchart of a further exemplary embodiment of the method.

FIG. 1 illustrates a flowchart of an exemplary embodiment of a method for determining a gap in traffic for the lane change of a transportation vehicle 100, for example, as cooperative merging assistance. The lane change can correspond, for example, to merging, swerving or overtaking. FIG. 1*a* shows a block diagram of an exemplary embodiment of a vehicle-to-vehicle communication system 10 designed to carry out the method. FIG. 1*b* shows a flowchart of an extended exemplary embodiment of the method.

Figure 5:
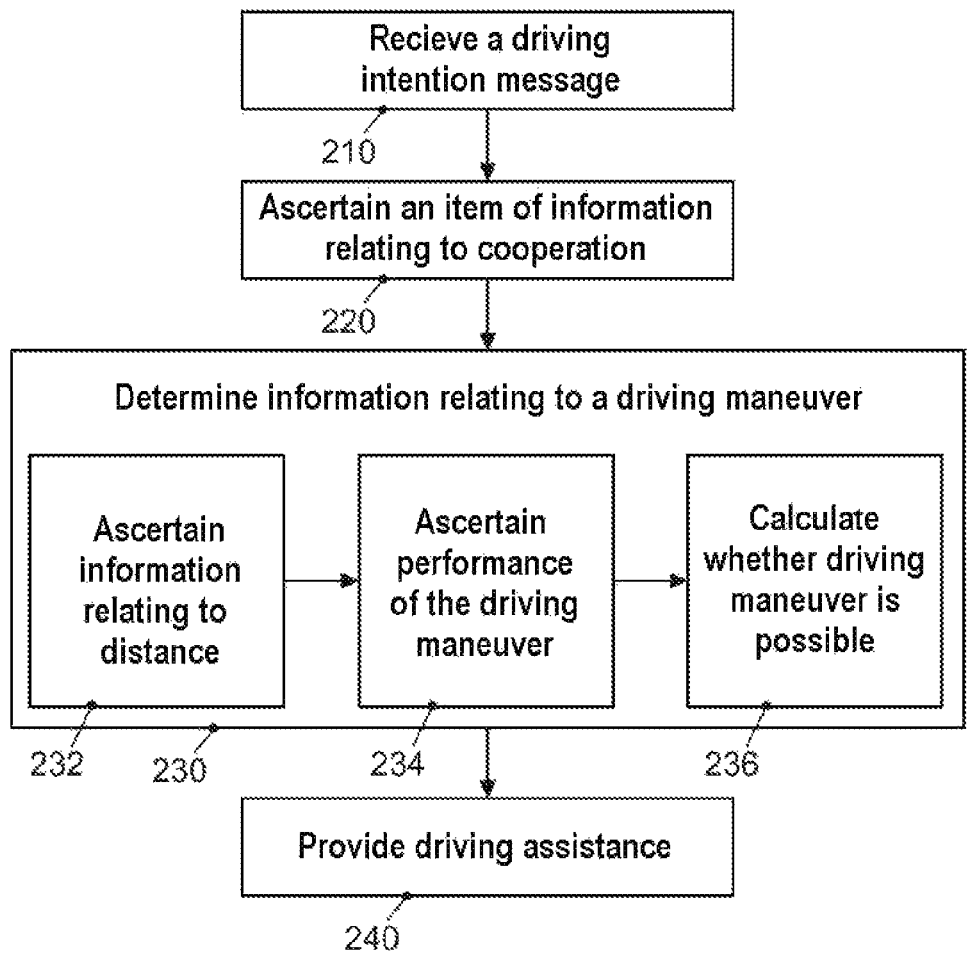
FIG. 5 illustrates a flowchart of an exemplary embodiment of a method for a transportation vehicle.

In at least some exemplary embodiments, the transportation vehicle 100, at least one further transportation vehicle 200 and/or a transportation vehicle 205 from FIG. 5, could correspond to a land transportation vehicle, a road transportation vehicle, a transportation vehicle, an off-road transportation vehicle, a motorized transportation vehicle or a heavy goods transportation vehicle, for example.

The method comprises identifying 110 the gap in traffic based on a first detection process and based on a second detection process. The first detection process is based on at least one vehicle-to-vehicle status message from at least one further transportation vehicle 200. The second detection process is based on an on-board sensor system of the transportation vehicle 100.

In at least some exemplary embodiments, the at least one vehicle-to-vehicle status message may correspond to a status message which is periodically provided by the at least one further transportation vehicle 200 to provide transportation vehicles in a surrounding area with information relating to the transportation vehicle, for example, a position, a speed, a trajectory and/or a transportation vehicle type. The method may also comprise, for example, receiving the at least one vehicle-to-vehicle status message via a vehicle-to-vehicle interface, for example, a vehicle-to-vehicle interface 16 of the apparatus 10.

In some exemplary embodiments, the at least one vehicle-to-vehicle status message can comprise information relating to a position and/or a trajectory of the at least one further transportation vehicle 200, for example, relative to the transportation vehicle 100 or in absolute terms in a global or regional coordinate system. The first detection process can be based on the information relating to the position and/or the trajectory of the at least one further transportation vehicle 200. For example, the identification process 110 can also comprise calculating a map containing the positions and/or trajectories of the at least one further transportation vehicle 200.

Figure 5A:
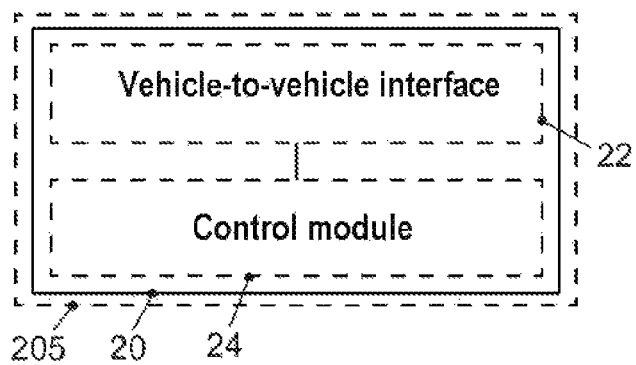
FIG. 5a illustrates a block diagram of an exemplary embodiment of a control system for a transportation vehicle.

The vehicle-to-vehicle interface, for example, the vehicle-to-vehicle interface 16 and/or a vehicle-to-vehicle interface 22 from FIG. 5*a*, can be designed, for example, to communicate via a shared communication channel (also called broadcast channel), and the vehicle-to-vehicle interface 16; 22 can be designed to receive the at least one vehicle-to-vehicle status message as a message to a plurality of receivers (also called broadcast). In some exemplary embodiments, vehicle-to-vehicle communication of the vehicle-to-vehicle interface can correspond either to a direct wireless communication connection between two transportation vehicles, for example, without the use of a base station, for instance, according to IEEE 802.11p (a standard of the Institute of Electrical and Electronics Engineers), or by a base station. The vehicle-to-vehicle interface 16; 22 can be designed, for example, to wirelessly communicate directly with further transportation vehicles in a surrounding area.

In at least some exemplary embodiments, the on-board sensor system can comprise at least one element from the group of camera sensor, radar sensor, lidar sensor and transit time sensor.

In at least some exemplary embodiments, the process of identifying 110 the gap in traffic can determine a map of positions and trajectories of the at least one further transportation vehicle 200, for example, by evaluating the status messages. This map of positions can be supplemented, made more precise or verified by the identification process 110 by the second detection process using an on-board sensor system. On the basis of this two-stage detection process, the identification process can determine a more detailed map of positions of the at least one further transportation vehicle 200 and other transportation vehicles or obstacles. Once the map has been created, the identification process 110 can also calculate the gap in traffic or a plurality of gaps in traffic, for example, based on the map and a length of the at least one further transportation vehicle 200, which may be included in the status messages, or based on sensor data from the transportation vehicle's own on-board sensor system or from remote transportation vehicles.

In at least some exemplary embodiments, the first detection process can take place before the second detection process. Alternatively, the first detection process and the second detection process can be carried out concurrently. For example, the first detection process and the second detection process can be carried out during the run time of the method and can provide results of the detection regularly or irregularly.

In some exemplary embodiments, different variations of the V2X transportation vehicle equipment can be distinguished for the identification process 110, for instance, by virtue of the vehicle-to-vehicle communication system 10 and/or the vehicle-to-vehicle interface 16.

Figure 2:
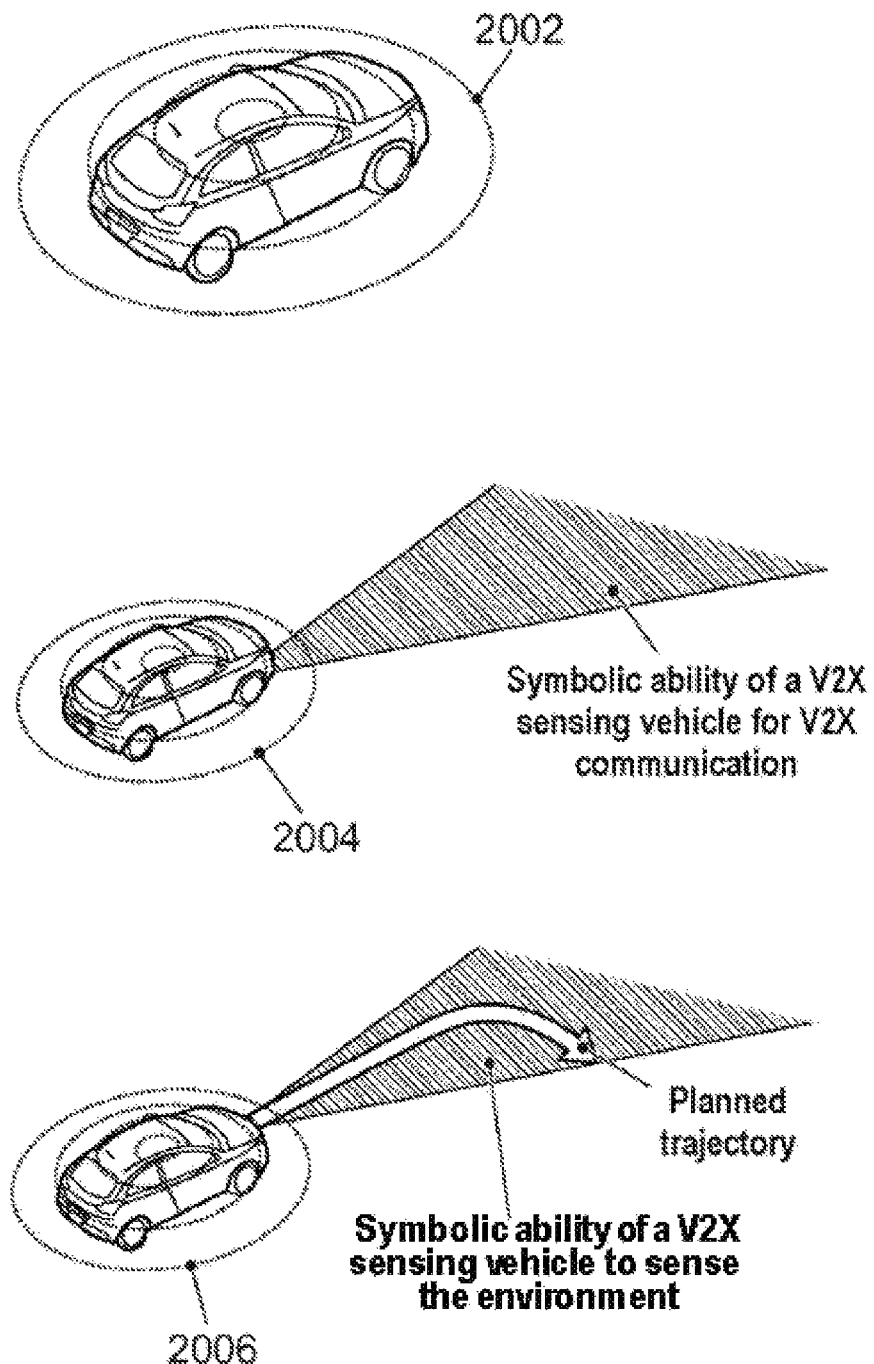
FIG. 2 shows different levels of V2X abilities of a transportation vehicle.

In some exemplary embodiments, V2X transportation vehicles are equipped with a basic V2X system. They transmit and receive status messages (Cooperative Awareness Messages, CAM, cf. ETSI EN 302 637-2 v1.3.0, or Basic Safety Messages, BSM) and can process them. FIG. 2, 2002, shows a V2X transportation vehicle having a basic V2X system. Status messages include, inter alia, the position, speed, direction of travel and acceleration of the transmitting transportation vehicle. In the case of low to medium penetration of V2X transportation vehicles on the road, a gap for the lane change possibly cannot be determined on the basis of exclusively status information. In the case of high penetration of V2X transportation vehicles, a gap for the lane change cannot be exactly determined by the identification process 110 in some exemplary embodiments on the basis of exclusively status information, but rather only the probability of its existence. The reason for the uncertainty is that both gaps and unequipped transportation vehicles may be situated between the V2X transportation vehicles. This cannot be distinguished solely on the basis of status information. If 100% of the transportation vehicles are equipped with the basic V2X system, distances between two transportation vehicles can possibly be derived from the status information if the transportation vehicle lengths are known (including possible trailers or semitrailers). In the identification process, the distances and therefore the sizes of the gaps between two transportation vehicles can be calculated by evaluating the transmitted transportation vehicle positions in the request transportation vehicle 110. The complete equipment of all transportation vehicles with a V2X system and the simultaneous knowledge of the transportation vehicle lengths possibly cannot be presupposed for practice.

The accuracy of the gap estimation in the identification process 110 may be greater, the higher the V2X penetration rate. To generate a complete image of the traffic situation, the on-board sensor system can therefore be additionally used. In the combination of the on-board sensor system and V2X status messages, the perception would take place in two operations in the lane change assistant function in some exemplary embodiments.

As long as the on-board sensor system cannot capture the road area of the planned/possible lane change maneuver (for example, on account of concealment or excessive distance), the identification process 110 by the transportation vehicle system or the vehicle-to-vehicle communication system 10 can determine that area in the oncoming traffic in which a gap will be able to be found with a sufficiently high probability (rough detection) on the basis of the V2X status messages. In a longitudinal control process 120, the request transportation vehicle can base its longitudinal control, for example, on this "probable gap" and can approach it. If the "probable gap" area has entered the capture range of the on-board sensor system, the available gaps can be more accurately detected and assessed (fine detection).

In some exemplary embodiments, in addition to the status messages, V2X transportation vehicles can also transmit messages containing environmental information which they have obtained with the aid of their on-board sensors (for example, detected objects). FIG. 2, 2004, shows a symbolic representation of the ability for V2X communication of a V2X sensing transportation vehicle designed to transmit/receive messages containing environmental information. This is referred to as collective perception or "Environmental Perception Message (EPM)". The collective perception allows statements to be made relating to road areas which are occupied by transportation vehicles and relating to free road areas. The request transportation vehicle can obtain information relating to the absolute size of a gap and relating to its position or speed from the EPM.

In some exemplary embodiments, the identification process 110 can also be based on a third detection process. The third detection process can be based on vehicle-to-vehicle messages containing environmental information from the at least one further transportation vehicle 200. The environmental information can be based on on-board sensors of the at least one further transportation vehicle 200.

The on-board sensors of the at least one further transportation vehicle 200 may comprise, for example, at least one element from the group of camera sensor, radar sensor, lidar sensor and transit time sensor. In at least some exemplary embodiments, the environmental information may comprise sensor data from the at least one further transportation vehicle 200, for example, sensor data from a collective perception of the environment of the at least one further transportation vehicle. For example, the environmental information may be based on sensor recordings of an environment of the at least one further transportation vehicle 200 by at least one on-board sensor of the at least one further transportation vehicle 200. The sensor data may correspond, for example, to raw data, for example, camera sensor data, radar sensor data, lidar sensor data and/or transit time sensor data, or may correspond to processed data, for instance, a distance and/or position of foreign objects captured by the at least one further transportation vehicle 200.

For example, the identification process 110 can use the environmental information to construct a virtual field of view or virtual sensor coverage from a combination of sensor data from the on-board sensor system of the transportation vehicle 100 in the second detection process and the sensor data from the at least one further transportation vehicle in the third detection process. As a result of the sensor data being combined, the multi-stage detection process can also be carried out for positions which are concealed from the point of view of the sensors of the transportation vehicle 100 for the identification process 110.

If only some of the transportation vehicles in the lane into which merging is intended to be carried out transmit EPMs, some of the available gaps can be uniquely identified. In some cases, there is a restriction that sufficiently large gaps which have not been detected are not taken into account in the identification process 110.

For a period after the market launch of V2X, V2X transportation vehicles of different generations and transportation vehicles not equipped with V2X technology will presumably be found in the road traffic. Therefore, the combination of the methods described may be desired. In the sense of the procedure described above, a rough detection process on the basis of status messages can be combined with a subsequent fine detection process based on the transportation vehicle's own on-board sensor system and an identification of gaps on the basis of EPMs.

The V2X transportation vehicle 100 with the lane change request can assume a passive role by searching for a suitable gap on the basis of an analysis of the received messages or by waiting for a suitable gap. The transportation vehicles in the lane into which merging is intended to be carried out can assume a passive or an active role. In the passive role, they transmit environmental messages (Environmental Perception Message, EPM), for example, and as a result show possible gaps, or transmit status messages or do not transmit any messages. In the active role, they can create a suitable gap if it is not present (cooperative behavior). This is based on relevance filtering (for example, by method operation at 220 from FIG. 5), for example.

Figure 3A:
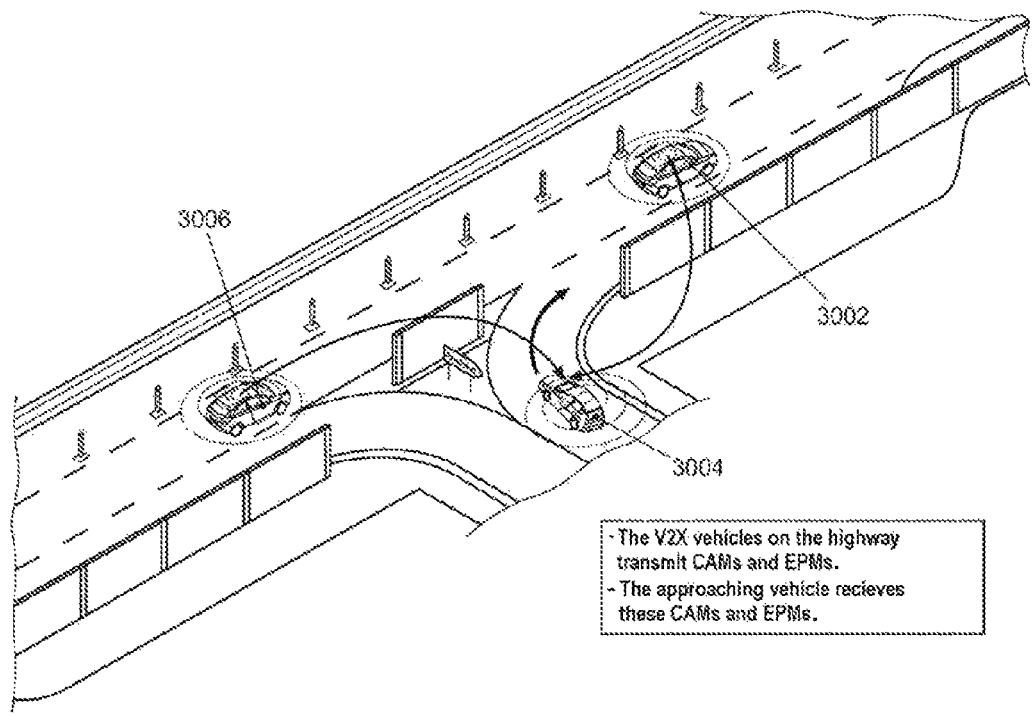
FIGS. 3a-e show various phases of an exemplary embodiment.
Figure 3B:
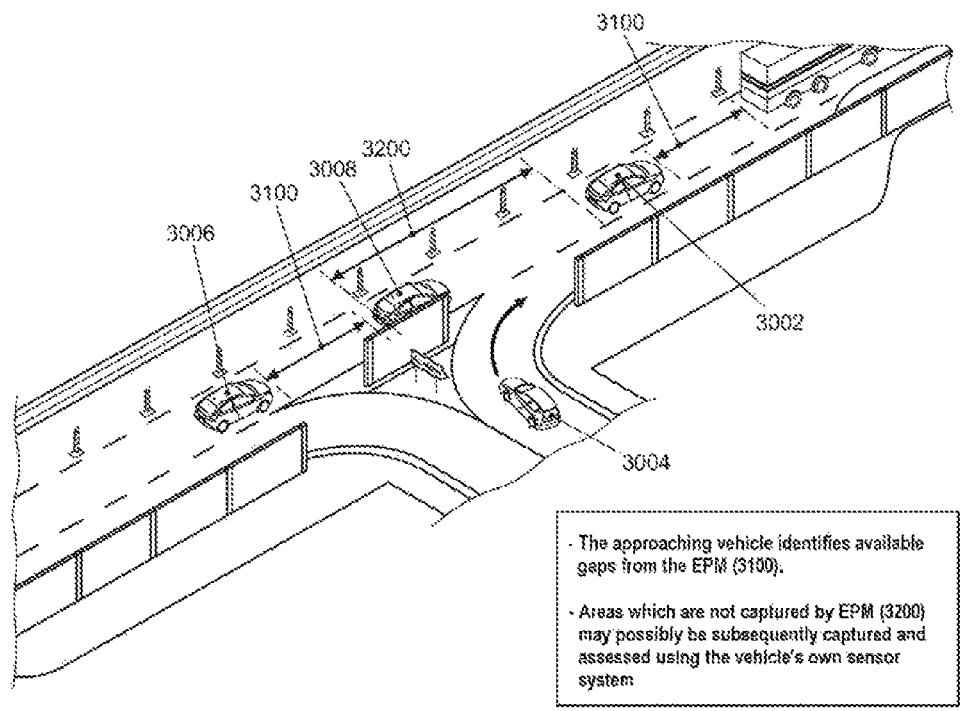

FIGS. 3a-e show an exemplary embodiment. The transportation vehicles 3002, 3004 and 3006 transmit status messages and messages containing environmental information. Transportation vehicle 3004 would like to drive onto the highway and captures the transportation vehicles 3002 and 3006 via the status messages, for example. In FIG. 3b, the transportation vehicle 3004 identifies 110 available gaps in traffic 3100 from the environmental information from the transportation vehicles 3002 and 3006. Areas 3200 which are not captured by the environmental information and can be produced, for example, by a transportation vehicle 3008 which does not provide any messages containing environmental information can be captured by the transportation vehicle 3004 with the on-board sensor system.

In some exemplary embodiments, the method also comprises longitudinally controlling 120 the transportation vehicle parallel to the identified gap in traffic. In at least some exemplary embodiments, the longitudinal control 120 corresponds to controlling a speed of the transportation vehicle 100 in the direction of travel or controlling a position of the transportation vehicle 100 in the direction of travel. In some exemplary embodiments, the longitudinal control 120 can be carried out in an automated manner by an adaptive cruise control system (ACC). The longitudinal control 120 may comprise, for example, providing a speed/time profile for the adaptive cruise control system. Alternatively or additionally, the longitudinal control 120 can comprise displaying a longitudinal control aid for a driver of the transportation vehicle 100. The longitudinal control aid can correspond, for example, to a visual aid on a screen or a projection surface (for example, a head-up display). For example, the longitudinal control aid can indicate whether the driver of the transportation vehicle is supposed to accelerate or brake to reach the identified gap. Alternatively or additionally, the longitudinal control aid can correspond to acoustic announcements or advisory tones. The longitudinal control 120 can also comprise, for example, providing a control signal for an output device, for instance, a screen, a projector, or an audio output unit. In some exemplary embodiments, the transportation vehicle 100 can correspond to an automatically moving transportation vehicle. The longitudinal control 120 can correspond, for example, to longitudinally controlling the automatically moving transportation vehicle 100 based on the identified gap in traffic.

In the longitudinal control phase, the request transportation vehicle 100 can move parallel to the identified gap to then initiate the third phase. This may be carried out in an automated manner by an ACC system, in which the cooperative lane change function specifies the necessary speed/time profile to the ACC system. A purely displaying function and corresponding longitudinal control of an automatically moving transportation vehicle are also conceivable.

Figure 3C:
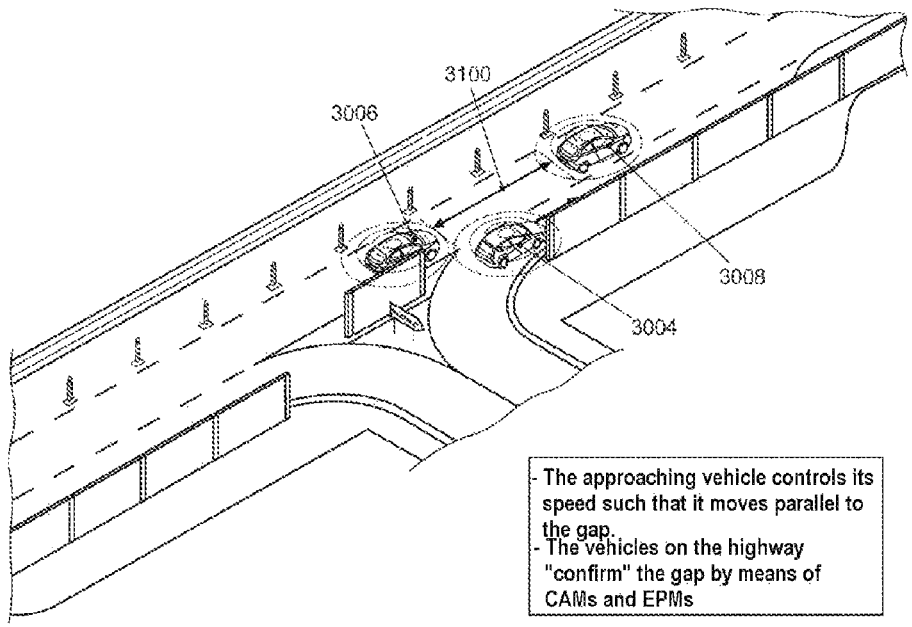

FIG. 3c shows a continuation of the exemplary embodiment. The transportation vehicle 3004 is on the on-ramp and controls its speed in such a manner that it moves parallel to the gap in traffic 3100. The transportation vehicles on the route, for instance, the transportation vehicle 3006, can confirm the gap in traffic by messages containing environmental information.

In some exemplary embodiments, the transportation vehicle 100 can correspond to an automatically moving transportation vehicle, for instance, a transportation vehicle which is designed to autonomously reach a destination without regular driver intervention. The longitudinal control 120 can correspond to longitudinally controlling the automatically moving transportation vehicle 100, for example.

In some exemplary embodiments, the method also comprises lateral control 130 of the transportation vehicle by a lane change parallel to the identified gap in traffic. The lateral control 130 can be carried out, for example, when the longitudinal control 120 has positioned the transportation vehicle 100 parallel to the identified gap in traffic. In at least some exemplary embodiments, the lateral control 130 can correspond to controlling a position of the transportation vehicle 100 transversely with respect to the direction of travel. The lateral control 130 can correspond, for example, to lateral control carried out by the transportation vehicle or lateral control by the driver of the transportation vehicle 100 which is assisted by the transportation vehicle. The lateral control 130 can comprise, for example, a driver-initiated automated lane change. For example, the driver can provide an impetus for the lane change, and an assistance system can carry out the lane change during lateral control 130. Alternatively or additionally, the lateral control 130 can comprise displaying a lateral control aid for a driver of the transportation vehicle 100. For example, the lateral control aid may correspond to a visual or acoustic notification from an output device of the transportation vehicle. For example, the lateral control 130 may comprise providing a control signal for the output device.

In some exemplary embodiments, the transportation vehicle 100 can correspond to an automatically moving transportation vehicle. The lateral control 130 can correspond to laterally controlling the automatically moving transportation vehicle 100.

In the third phase/method operation (for instance, the lateral control 130), the request transportation vehicle can carry out its lane change. This can be carried out manually, possibly with the assistance of appropriate advice for the driver. A driver-initiated automated lane change is also conceivable or appropriate lateral control of an automatically moving transportation vehicle. The transportation vehicles in the lane into which merging is intended to be carried out can also have an (assisting) passive role in some exemplary embodiments by regularly "confirming" the gaps to the approaching transportation vehicles using messages containing environmental information.

Figure 3D:
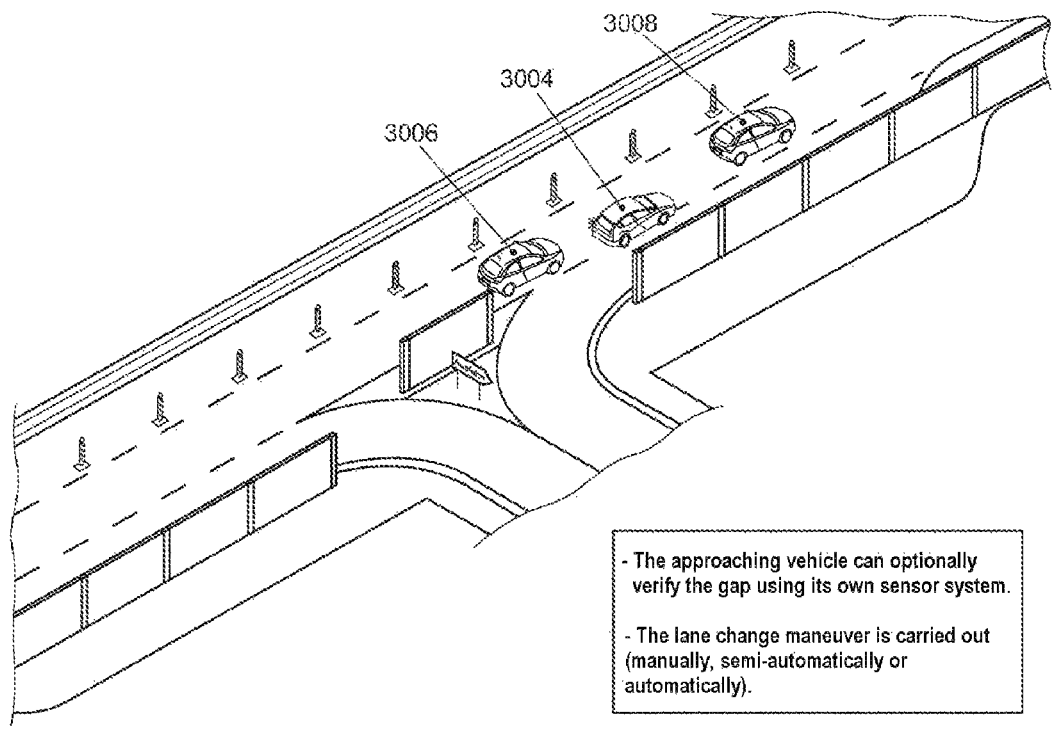

FIG. 3*d* shows a further continuation of the exemplary embodiment. Transportation vehicle 3004 can verify the gap between the transportation vehicles 3008 and 3006, for example, by on-board sensors in the identification process 110 and can carry out lateral control 130, for example, in a manual, semi-automated or automated manner.

In at least some exemplary embodiments, the identification process 110, the longitudinal control 120 and/or the lateral control 130 may be based on information relating to traffic rules and/or traffic laws (restrictions). The identification process 110, the longitudinal control 120 and/or the lateral control 130 can be carried out in such a manner that the traffic rules and/or traffic laws are not violated.

In some exemplary embodiments (see FIG. 1*b*), the method can also comprise determining 150 a driving intention of a driver of the transportation vehicle with respect to the lane change. For example, the determining process 150 can determine a position of the transportation vehicle 100. On the basis of the position of the transportation vehicle and a digital map, the determining process 150 can also comprise ascertaining a road section. One or more possible driving intentions can be assigned to the road section, for example. One or more trigger conditions based on one or more trigger variables can be assigned to the one or more possible driving intentions. The determining process 150 can also comprise receiving information relating to internal trigger variables for determining a current driving intention based on on-board sensors or actuators of the transportation vehicle. In addition, the determining process 150 can also comprise receiving information relating to external trigger variables for determining the driving intention via the vehicle-to-vehicle interface. The process of determining 150 the driving intention can also comprise determining the driving intention based on the road section, the information relating to the internal and/or external trigger variables and the one or more trigger conditions. For example, the trigger conditions can comprise upper or lower limits for trigger variables and/or can be based on probability functions which can be based on one or more trigger variables.

In some exemplary embodiments, the method can also comprise ascertaining 155 that the identification process 110 does not identify a gap in traffic. For example, the ascertaining process 155 can detect that the identification process 110 does not identify a gap in traffic before the end of an acceleration lane, on-ramp or off-ramp.

The method can also comprise transmitting 160 a driving intention message based on the determining process 150 and/or the detection process 155. The transmission process 160 can be carried out, for example, if the determining process 150 determines a driving intention and/or if the detection process 155 detects that the identification process 110 does not identify a gap in traffic. The transmission process 160 can also comprise calculating the driving intention message based on a protocol format. The transmission process 160 can correspond to a transmission process via the vehicle-to-vehicle interface. The driving intention message can comprise, for example, information relating to a predicted trajectory of the driving intention, for example, as a time/position statement or as a statement of a destination area of the driving intention. The driving intention message can comprise, for example, an item of information relating to a future lane change request of the transportation vehicle 100.

These messages can be transmitted in addition to status messages or in addition to status and environmental messages. FIG. 2, 2006, shows a symbolic representation of the ability for V2X communication of a V2X cooperative transportation vehicle designed to transmit/receive messages driving intention messages comprising a predicted trajectory. A transmission process can be carried out, for instance, if the method has determined (detected) 150 the intention of the request transportation vehicle 100 or if it does not identify 110 a suitable gap in the relevant area. According to a method operation at 220 from FIG. 5, a transportation vehicle 205 can also carry out a relevance assessment and can create a sufficiently large gap if necessary. This gap can be detected according to the embodiment described above.

Figure 3E:
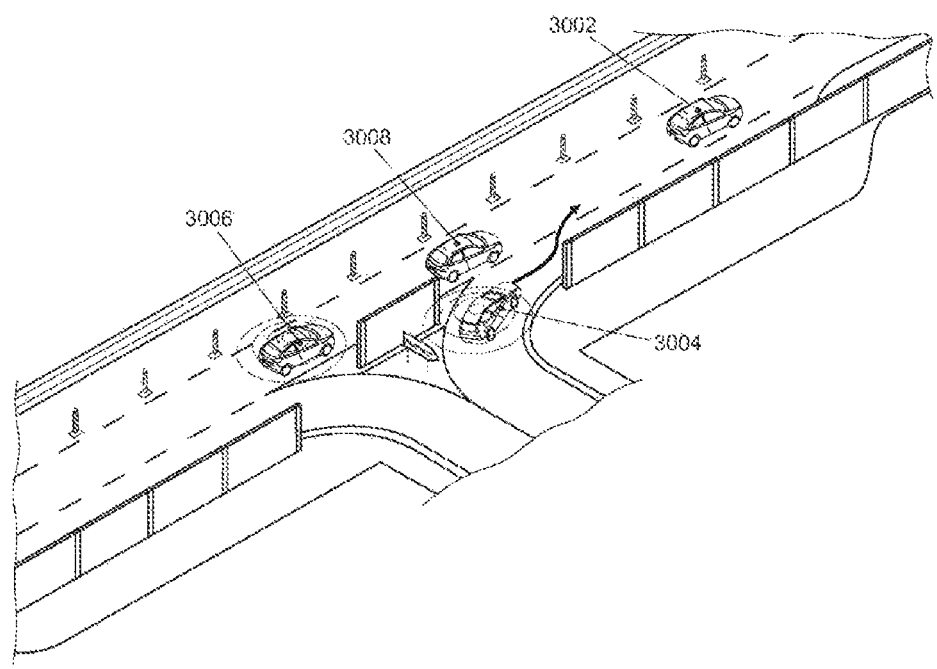

FIG. 3*e* shows a continuation of the exemplary embodiment. When driving onto the highway, the transportation vehicle 3004 can provide a driving intention message which can be classified as relevant by the transportation vehicle 3006, for example, in a method operation at 220 from FIG. 5.

Figure 4:
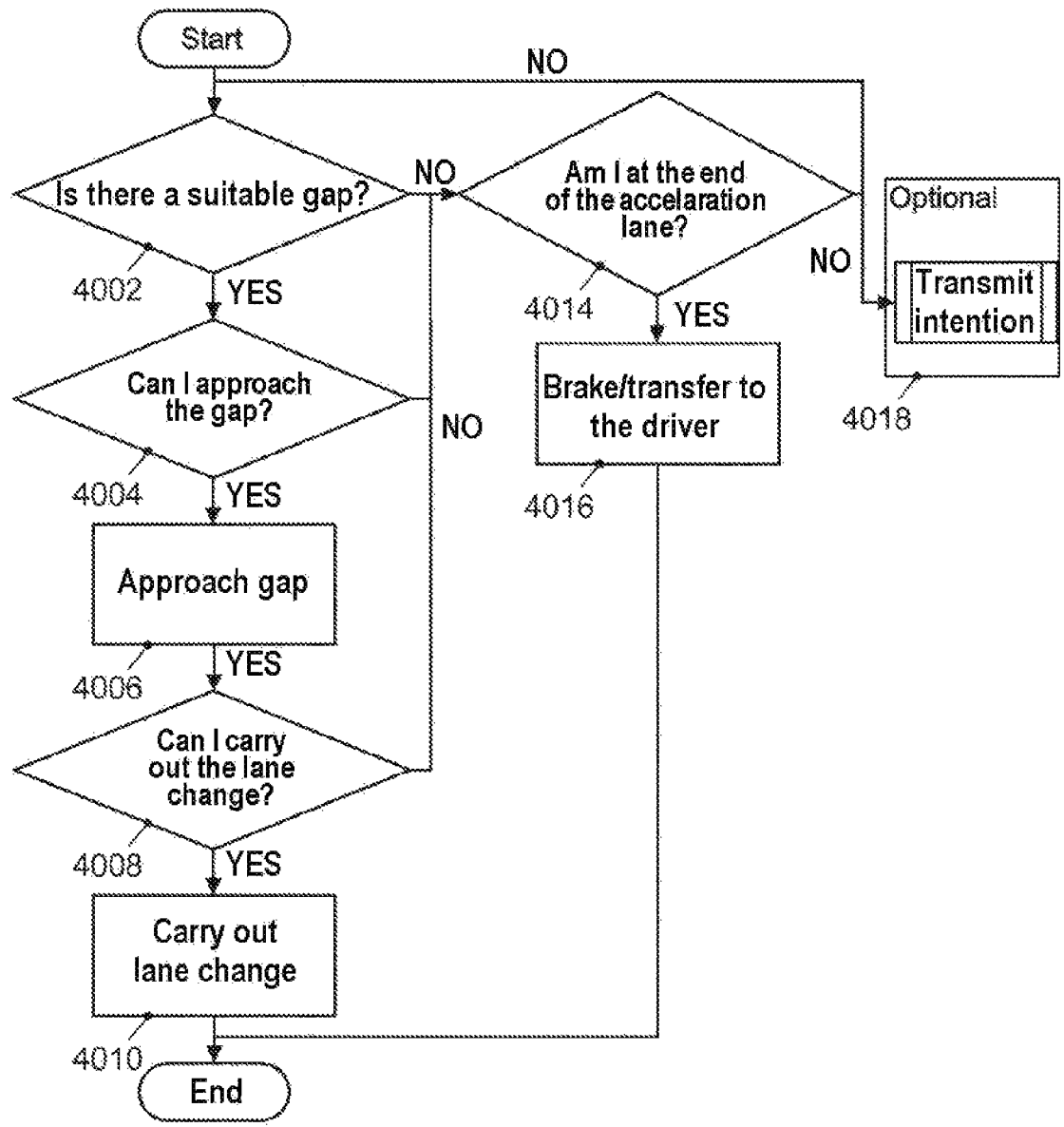
FIG. 4 shows a flowchart of an exemplary implementation of the method.

FIG. 4 shows a flowchart of an exemplary implementation of the method. The method can begin, for example, with the identification 4002 of whether there is an appropriate gap, for instance, by the identification process 110. If there is a gap, it is possible to check 4004 whether this gap can be approached. If it can be approached, it can be approached 4006, for instance, by longitudinal control 120. It is then possible to check 4008 whether a lane change is possible. If this is possible, it can be carried out 4010, for instance, by the lateral control 130, and the method can be ended 4012. If one of operations at 4002, 4004 or 4008 is negative, it is possible to check 4014 whether the transportation vehicle is at the end of the acceleration lane. If so, it is possible to brake or transfer to the driver 4016 and end the method 4012. If not, a driving intention message, for example, can be provided 4018, for instance, by a providing process 160. Alternatively, the driving intention message can also be provided 4018 without the identification process 4002.

In at least some exemplary embodiments, the vehicle-to-vehicle communication system 10 can also comprise a control module 14 designed to carry out method operations at 110-150. The vehicle-to-vehicle communication system 10 can also comprise an interface 12 which is designed to receive the on-board sensor system of the transportation vehicle. The control module 14 is coupled to the interface 12 and to the vehicle-to-vehicle interface 16.

In exemplary embodiments, the control module 14, and/or a control module 24 from FIG. 5*a*, can correspond to any desired controller or processor or a programmable hardware component. For example, the control module 14; 24 can also be implemented as software which is programmed for a corresponding hardware component. In this respect, the control module 14; 24 can be implemented as programmable hardware with accordingly adapted software. In this case, any desired processors, such as digital signal processors (DSPs), can be used. In this case, exemplary embodiments are not restricted to a particular type of processor. Any desired processors or else a plurality of processors are conceivable for implementing the control module 14; 24.

The interface 12 can correspond, for example, to one or more inputs and/or one or more outputs for receiving and/or transmitting information, for instance, in digital bit values, based on a code, within a module, between modules or between modules of different entities.

FIG. 5 illustrates a flowchart of an exemplary embodiment of a method for a transportation vehicle 205. FIG. 5a illustrates a block diagram of an exemplary embodiment of a vehicle-to-vehicle communication system 20 designed to carry out the method. The transportation vehicle 205 may be included, for example, in the at least one further transportation vehicle 200 from FIG. 1a.

The method comprises receiving 210 a driving intention message with a lane change request from a requesting transportation vehicle 100. The receiving process 210 can be carried out, for example, by vehicle-to-vehicle communication, for example, via a vehicle-to-vehicle interface. In some exemplary embodiments, the vehicle-to-vehicle communication system can comprise a vehicle-to-vehicle interface 22 designed for vehicle-to-vehicle communication. The vehicle-to-vehicle communication system can also comprise a control module 24 designed to receive 210 via the vehicle-to-vehicle interface 22. The vehicle-to-vehicle interface 22 can be coupled to the control module 24.

The method also comprises ascertaining 220 an item of information relating to cooperation in a cooperative driving maneuver with the requesting transportation vehicle 100. The information relating to the cooperation indicates whether the transportation vehicle 205 is possible as a cooperation partner and whether a cooperative behavior is possible taking into account the traffic situation based on the driving intention message. In some exemplary embodiments, it is also possible to check/display whether the cooperative behavior is possible based on further restrictions.

As a relevance assessment, the ascertaining process 220 can check, for example, in a plurality of operations, whether the receiving transportation vehicle is possible in principle as a cooperation partner and whether a cooperative behavior is possible taking into account the traffic situation and further restrictions. These restrictions result, for example, from the limits of the driver's willingness to cooperate and from other aims, such as efficient driving. For example, the ascertaining process 220 may be based on information relating to a driving behavior of a driver of the transportation vehicle 205. The method can also comprise determining the information relating to the driving behavior, for example, to determine driving dynamics or a probability of the driver overtaking.

For example, the driver could specify the maximum permissible deceleration when increasing gaps by the information relating to the driving behavior. The process of determining the driving dynamics could derive this from its driving experience according to the possibility of configuring the distance to the leading transportation vehicle within particular limits in the case of an ACC system. It would also be possible to determine whether or not lane changes can be taken into account for a cooperative maneuver.

The method or the control module 24 could also be designed to estimate the energy balance of the cooperative maneuver. This could be influenced by the road topology and, under certain circumstances, could be different for transportation vehicles with an internal combustion engine than for transportation vehicles with an electric drive (for example, in the case of a downhill journey). Accordingly, an upper limit for a negative energy balance (energy is consumed) could also be defined here.

The traffic situation could also be concomitantly included in the calculation, for example, whether a lane change is possible from the point of view of the traffic situation.

In an exemplary embodiment, the ascertaining process 220 has two operations. Operation at 1 of the ascertaining process 220 is, for example:

V2X messages are broadcast in some exemplary embodiments. Therefore, the ascertaining process 220 for the receiving transportation vehicle 205 can first of all check whether the transportation vehicle is actually in a road section which is relevant to the cooperative maneuver. For this purpose, it checks, for example, where the transportation vehicle is situated relative to the area of the potential cooperation. The transportation vehicle is not possible as a cooperation partner, for example, if it has already passed this area or if it is in a lane which is not affected (for example, if merging is intended to be carried out in the right-hand lane, but the transportation vehicle is in the left-hand lane or if the transportation vehicle is moving in the oncoming lane). The next operation can follow in the event of a positive check, otherwise the relevance assessment is aborted.

Operation at 2 of the ascertaining process 220 is, for example:

The ascertaining process 220 can estimate whether a speed of the transportation vehicle 205 as the accept transportation vehicle and the speed of the request transportation vehicle match, with the result that cooperation is possible. In this case, it can proceed from its current speed (also its planned speed depending on the degree of automation) and a predicted speed of the request transportation vehicle. This prediction may, on the one hand, on the messages received by the request transportation vehicle and, on the other hand, on an analysis of the road and traffic situation in which the request transportation vehicle is situated (maximum permissible speed, course of the road from a digital map or determined from the transportation vehicle's own on-board sensor system, speed of the transportation vehicles in front of the request transportation vehicle or evaluation of their V2X messages). If the speeds match, the next operations can follow and otherwise the relevance assessment can be aborted.

An abort could be carried out, for example, if the transportation vehicle is too slow or is too far away and the request transportation vehicle has probably already carried out its lane change maneuver when the transportation vehicle reaches the relevant area. Accordingly, an abort could also be carried out if the transportation vehicle is too fast or is already too close.

The method also comprises determining 230 information relating to a driving maneuver for maneuver planning. The information relating to the driving maneuver can comprise, for example, a trajectory of a driving maneuver, for example, as a time/position chain. The maneuver planning likewise takes place in a plurality of operations in at least some exemplary embodiments. The determining process 230 comprises ascertaining 232 information relating to at least one distance to a leading transportation vehicle and/or a trailing transportation vehicle to make it possible to calculate whether the lane change request can be complied with in a possible cooperation area. The determining process can ascertain 232, for example, the extent to which the distance to its leading transportation vehicle and possibly also to its trailing transportation vehicle has to be adapted at the current speed for a lane change maneuver. If the length of the request transportation vehicle (and possible trailer, semi-trailer or the like) has been transmitted, for instance, in the driving intention message or by status messages from the request transportation vehicle, this can be taken into account.

The determining process 230 also comprises ascertaining 234 performance of the driving maneuver based on the information relating to the driving maneuver, the information relating to the at least one distance, a speed of the transportation vehicle 205 and a distance to the possible cooperation area. On the basis of the result of the preceding operations, the ascertaining process 234 can ascertain what performance of the driving maneuver (for example, deceleration/time profile) would be necessary for the cooperation taking into account its speed and distance to the possible cooperation area.

The determining process 230 also comprises calculating 236 whether the driving maneuver is possible taking into account the traffic situation (and the further restrictions, for example). The process of calculating 236 whether this driving maneuver is possible taking into account the restrictions (cf. above). In the event of a negative checking result, the maneuver planning can be aborted.

The method also comprises providing 240 driving assistance to perform the driving maneuver. The process of providing 240 the driving assistance can correspond, for example, to automated performance of the driving maneuver, for example, via a driving assistance system or by adapting an automatically moving transportation vehicle. Alternatively or additionally, the process of providing 240 the driving assistance can correspond to providing advice for carrying out the driving maneuver for a driver of the transportation vehicle 205 via a human-machine interface. The human-machine interface can correspond, for example, to a screen, a projector or an audio output module. The vehicle-to-vehicle communication system 20 can comprise the human-machine interface, for example. The advice can correspond, for example, to spoken instructions, audio signals and/or a visual representation of the advice.

In some exemplary embodiments, the providing process 240 can also comprise longitudinal control and/or lateral control based on the driving intention messages and status messages from the at least one further transportation vehicle, environmental information from the at least one further transportation vehicle and/or sensor data from the transportation vehicle 205.

Depending on the degree of automation, the transportation vehicle 205 can carry out the planned maneuver in an automated manner and the providing process 240 can likewise inform the driver via a suitable HMI or, in the case of manual operation of the transportation vehicle, can request the driver to carry out the cooperative maneuver. For this purpose, it can provide 240 suitable advice via a corresponding HMI.

In the case of a positive relevance assessment and successful maneuver planning, the transportation vehicle 205 can become an accept transportation vehicle. If necessary, it may create a sufficiently large gap. For this purpose, it has three possibilities in principle: braking, acceleration and lane change. The gap produced in this manner is detected by the request transportation vehicle and is then controlled. In this case, further accept and acknowledge messages can possibly be interchanged. The providing process 240 can also comprise providing a control signal for controlling the braking, acceleration or lane change functionality, for example, via an interface, for instance, a control network bus (also called Controller Area Network bus, CAN bus) of the transportation vehicle 205. The vehicle-to-vehicle communication system can comprise the interface.

During the cooperative maneuver of the accept transportation vehicle, different variations can be distinguished depending on the V2X transportation vehicle equipment.

In some exemplary embodiments, the vehicle-to-vehicle interface 22 corresponds to a basic V2X system. In this disclosed embodiment, the accept transportation vehicle can carry out a passive role, for example, in which it only transmits status messages and does not carry out any cooperative maneuvers. However, an active role is also possible in special situations, in which the accept transportation vehicle creates gaps (cooperative behavior). Such a situation may exist, for example, on on-ramps or before lane closures. The basis of this is, for example, an analysis and interpretation of the traffic situation, the derivation of the requirement of other road users and the assessment of the transportation vehicle's own options for action (relevance assessment, ascertainment 220). Since the accept transportation vehicle cannot capture all transportation vehicles on the on-ramp on the basis of status messages in some exemplary embodiments, it will be able to react to the transportation vehicles known to it. The transportation vehicles detected by status messages also include, in principle, those which are detected by a corresponding on-board sensor system (for example, camera, radar, laser) when the transportation vehicles are in the detection range of the sensor system. A cooperative behavior with respect to at least some of the transportation vehicles is therefore possible. In addition, it is possible to interchange messages containing confirmations of the planned maneuvers (create a gap, lane change/merging).

Alternatively, the transportation vehicle 205 can also receive messages containing environmental information (EPM), in addition to the status messages, via the vehicle-to-vehicle interface. The accept transportation vehicle can also carry out a passive role in this disclosed embodiment in which it transmits status messages and EPMs and does not carry out any cooperative maneuvers.

However, an active role is also accordingly possible in special situations (for example, on on-ramps or before lane closures), in which the accept transportation vehicle creates gaps (cooperative behavior), for instance, by the providing process 240. The basis for this is again, for example, an analysis and interpretation of the traffic situation, the derivation of the requirement of other road users and the assessment of the transportation vehicle's own options for action (relevance filtering, 220-230). If only some of the transportation vehicles are equipped with V2X systems, the statement from above that not all transportation vehicles can be detected in some cases and a cooperative behavior is possible with respect to at least some of the transportation vehicles analogously applies.

It is conceivable for a plurality of transportation vehicles moving behind one another to conclude a relevance check with a positive result. It is also conceivable for coordination messages (for example, accept and acknowledge messages, a session ID) to be interchanged for a cooperative maneuver. The transportation vehicles involved could also be equipped with different generations of V2X technology. Different options are therefore conceivable in exemplary embodiments.

In some exemplary embodiments, coordination messages are not interchanged. As a result, a plurality of transportation vehicles can produce a gap, for example, which is suitable for the lane change operation. The request transportation vehicle could choose a gap.

Alternatively, coordination messages could be interchanged: the transportation vehicles can check, during the relevance assessment (ascertainment 220) and in parallel with the above-mentioned operations (230, 240), whether other transportation vehicles have already transmitted an accept message for the request transportation vehicle (assignment, for example, by a session ID transmitted by the request transportation vehicle). In the event of a positive check, the maneuver planning can be aborted. In the event of a negative checking result, the transportation vehicle itself can provide an accept message.

In at least some exemplary embodiments, the method can also comprise interchanging vehicle-to-vehicle coordination messages for coordinating the cooperative driving maneuver with at least one further transportation vehicle 200. The providing process 240 can also comprise providing a message relating to an acceptance of the lane change request for the requesting transportation vehicle 100 and the at least one further transportation vehicle 200 (accept message). If a message relating to an acceptance of the lane change request is received by a transportation vehicle of the at least one further transportation vehicle 200, the ascertaining process 220, determining process 230 and/or providing process 240 can be aborted, for example.

Another exemplary embodiment is a computer program for carrying out at least one of the methods described above when the computer program runs on a computer, a processor or a programmable hardware component. Another exemplary embodiment is also a digital storage medium which is machine-readable or computer-readable and has electronically readable control signals which can interact with a programmable hardware component in such a manner that one of the methods described above is carried out.

The features disclosed in the description above, the claims below and the accompanying figures may be of importance, and can be implemented, both individually and in any desired combination, for the realization of an exemplary embodiment in its various configurations.

Although some properties have been described in connection with an apparatus, it goes without saying that these properties also represent a description of the corresponding method, so that a block or a component of an apparatus should also be understood as a corresponding method operation or as a feature of a method operation. Analogously to this, properties described in connection with or as a method operation also represent a description of a corresponding block or detail or feature of a corresponding apparatus.

Depending on implementation requirements, exemplary embodiments may be implemented in hardware or in software. The implementation can be performed using a digital storage medium, for example, a floppy disk, a DVD, a Blu-Ray disc, a CD, a ROM, a PROM, an EPROM, an EEPROM or a FLASH memory, a hard disk or another magnetic or optical memory that stores electronically readable control signals that can interact or do interact with a programmable hardware component such that the respective method is carried out.

A programmable hardware component may be formed by a processor, a computer processor (CPU=Central Processing Unit), a graphics processor (GPU=Graphics Processing Unit), a computer, a computer system, an application-specific integrated circuit (ASIC), an integrated circuit (IC), a system on chip (SOC), a programmable logic element or a field programmable gate array (FPGA) having a microprocessor.

The digital storage medium may therefore be machine-readable or computer-readable. Some exemplary embodiments thus comprise a data storage medium that has electronically readable control signals that are capable of interacting with a programmable computer system or a programmable hardware component such that one of the methods described herein is carried out. At least one exemplary embodiment is therefore a data storage medium (or a digital storage medium or a computer-readable medium) on which the program for carrying out one of the methods described herein is recorded.

Generally, exemplary embodiments may be implemented as a program, firmware, computer program or computer program product having a program code or as data, wherein the program code or the data is or are operative to the effect of carrying out one of the methods when the program runs on a processor or a programmable hardware component. The program code or the data may, by way of example, also be stored on a machine-readable storage medium or data storage medium. The program code or the data can be present inter alia as source code, machine code or byte code and as other intermediate code.

Another exemplary embodiment is also a data stream, a signal train or a sequence of signals that represents or represent the program for carrying out one of the methods described herein. The data stream, the signal train or the sequence of signals may be configured, by way of example, to the effect of being transferred via a data communication link, for example, via the Internet or another network. Exemplary embodiments are thus also data-representing signal trains that are suitable for sending via a network or a data communication link, wherein the data represent the program.

A program according to at least one exemplary embodiment can implement one of the methods while it is carried out, for example, by reading memory locations or writing a datum or multiple data thereto, as a result of which, if need be, switching operations or other operations are brought about in transistor structures, in amplifier structures or in other electrical components, optical components, magnetic components or components operating on another functional principle. Accordingly, reading a memory location allows data, values, sensor values or other information to be captured, determined or measured by a program. Therefore, by reading one or more memory locations, a program can capture, determine or measure variables, values, measured variables and other information, and by writing to one or more memory locations, it can bring about, prompt or perform an action and actuate other devices, machines and components.

The exemplary embodiments described above are merely an illustration of the principles of the present disclosure. It goes without saying that modifications and variations of the arrangements and details described herein will become apparent to other persons skilled in the art. Therefore, the intention is for the disclosed embodiments to be restricted only by the scope of protection of the patent claims below, and not by the specific details that have been presented herein on the basis of the description and the explanation of the exemplary embodiments.

LIST OF REFERENCE SYMBOLS

10 Vehicle-to-vehicle communication system
12 Interface
14 Control module
16 Vehicle-to-vehicle interface
20 Vehicle-to-vehicle communication system
22 Vehicle-to-vehicle interface
24 Control module
100 Transportation vehicle
110 Identify a gap in traffic
120 Longitudinally control the transportation vehicle
130 Laterally control the transportation vehicle
150 Determine a driving intention
155 Ascertain that a gap in traffic has not been identified
160 Provide a driving intention message
200 At least one further transportation vehicle
205 Transportation vehicle
210 Receive a driving intention message
220 Ascertain an item of information relating to cooperation
230 Determine information relating to a driving maneuver
232 Ascertain information relating to a distance
234 Ascertain performance of the driving maneuver
236 Calculate whether the driving maneuver is possible
240 Provide driving assistance
2002 Transportation vehicle with basic V2X ability
2004 Transportation vehicle with V2X sensing ability
2006 Transportation vehicle with V2X sensing ability and designed to provide driving intention messages
3002 Transportation vehicle
3004 Transportation vehicle driving onto a highway
3006 Transportation vehicle
3008 Transportation vehicle without the ability to provide environmental information
3100 Detected gap in traffic
3200 Area which cannot be captured using environmental information
4002 Identify a gap in traffic
4004 Check whether the gap can be approached
4006 Approach the gap
4008 Check whether a lane change is possible
4010 Lane change
4012 End of the method
4014 Check whether the transportation vehicle is at the end of the acceleration lane
4016 Brake/transfer to the driver
4018 Provide a driving intention message

The invention claimed is:

1. A method for determining a gap in traffic between at least one transportation vehicle and a further transportation vehicle that is suitable for a lane change of the transportation vehicle, the method being performed under control of a control module implemented using at least one computer processor in the transportation vehicle, the method comprising:

performing a gap identification process to identify the gap in traffic, wherein the gap identification process is based on a first detection process, a second detection process, and a third detection process, wherein the first detection process is based on at least one vehicle-to-vehicle status message received by the transportation vehicle from at least one further transportation vehicle, wherein vehicle-to-vehicle status message includes information relating to a position and/or a trajectory of the at least one further transportation vehicle, wherein the second detection process is based on data generated by an on-board sensor system of the transportation vehicle, wherein the third detection process is based on vehicle-to-vehicle messages containing environmental information from the at least one further transportation vehicle, wherein the environmental information is based on sensor recordings of an environment of the at least one further transportation vehicle generated by at least one on-board sensor of the at least one further transportation vehicle, wherein the gap identification process wherein the vehicle-to-vehicle messages including environmental information include information that indicates road areas which are occupied by transportation vehicles and free road areas, wherein the gap identification process uses the environmental information to construct a virtual field of view or virtual sensor coverage from a combination of sensor data from the on-board sensor system of the transportation vehicle in the second detection process and the sensor data from the at least one further transportation vehicle in the third detection process, whereby, the gap identification process is performed for positions which are accessible by viewpoints of sensors of the on-board sensor system of the transportation vehicle and for viewpoints concealed from sensor view points of the on-board sensor system of the transportation vehicle; and in response to ascertaining that the gap identification process does not identify a gap in traffic, transmitting a driving intention message from the at least one transportation vehicle to at least one further transportation vehicle, wherein the driving intention message includes an item of information relating to a future lane change request of the transportation vehicle.

2. The method of claim 1, wherein the at least one vehicle-to-vehicle status message comprises information relating to the position and/or the trajectory of the at least one further transportation vehicle.

3. A method for controlling the transportation vehicle including the method for determining the gap in traffic of claim 1, wherein the method longitudinally controls the transportation parallel to the identified gap in traffic and/or laterally control s the transportation vehicle by a lane change parallel to the identified gap in traffic.

4. The method of claim 3, wherein the longitudinal control corresponds to controlling a speed or a position of the transportation vehicle in the direction of travel, and/or wherein the longitudinal control comprises providing a speed/time profile for an adaptive cruise control system, or wherein the longitudinal control comprises displaying a longitudinal control aid for a driver of the transportation vehicle, or wherein the transportation vehicle corresponds to an automatically moving transportation vehicle, and wherein the longitudinal control corresponds to longitudinally controlling the automatically moving transportation vehicle based on the identified gap in traffic.

5. The method of claim 3, wherein the lateral control corresponds to controlling a position of the transportation vehicle transversely with respect to the direction of travel, and/or wherein the lateral control is carried out when the longitudinal control has positioned the transportation vehicle parallel to the identified gap in traffic, and/or wherein the lateral control comprises a driver-initiated automated lane change, or wherein the lateral control comprises displaying a lateral control aid for a driver of the transportation vehicle, or wherein the transportation vehicle corresponds to an automatically moving transportation vehicle, and wherein the lateral control corresponds to laterally controlling the automatically moving transportation vehicle.

6. The method of claim 1, further comprising determining a driving intention of a driver of the transportation vehicle with respect to the lane change.

7. The method of claim 6, further comprising transmitting the driving intention message based on the detection of the driving intention.

8. A method for a transportation vehicle, the method being performed under control of a control module implemented using at least one computer processor in the transportation vehicle, the method comprising:
  receiving a driving intention message containing a lane change request for a future lane change from a requesting transportation vehicle, wherein the driving intention message comprises an item of information relating to a future lane change request of the transportation vehicle;
  ascertaining an item of information relating to cooperation in a cooperative driving maneuver with the requesting transportation vehicle based on a merging request required for the lane change request, wherein the ascertained item of information relating to the cooperation indicates whether the transportation vehicle is possible as a cooperation partner and whether a cooperative behavior is possible taking into account a traffic situation based on the received driving intention message;
  determining information relating to a driving maneuver by ascertaining information relating to at least one distance to a leading transportation vehicle and/or a trailing transportation vehicle to calculate whether the merging request is able to be complied with in a possible cooperation area, wherein the at least one distance pertains to a gap in traffic required to perform the merging request, wherein the information relating to the cooperative driving maneuver is determined based on information included in the received driving intention message and based on information generated by an on-board sensor system of the transportation vehicle, which both relate to at least one distance, a speed of the transportation vehicle and a distance to the possible cooperation area;
  ascertaining the cooperative driving maneuver to be performed based on the information relating to the cooperative driving maneuver;
  calculating whether the ascertained cooperative driving maneuver is possible taking into account the traffic situation;
  interchanging vehicle-to-vehicle coordination messages for coordinating the cooperative driving maneuver with the at least one further transportation vehicle; and
  providing driving assistance to perform the cooperative driving maneuver.

9. The method of claim 8, wherein the process of providing the driving assistance corresponds to automated or semi-automated performance of the driving maneuver, or wherein the process of providing the driving assistance corresponds to a process of providing advice for carrying out the driving maneuver for a driver of the transportation vehicle via a human-machine interface.

10. The method of claim 8, wherein the providing process also comprises providing a message relating to an acceptance of the lane change request for the requesting transportation vehicle and the at least one further transportation vehicle, and/or wherein, the ascertaining process, the determining process and/or the providing process is/are aborted in response to a message relating to an acceptance of the lane change request being received from the at least one further transportation vehicle.

11. A control system for a transportation vehicle, the control system comprising a control module implemented using at least one computer processor in the transportation vehicle being configured to:
  identify a gap in traffic between two transportation vehicles based on a first detection process, a second detection process, and a third detection process,
    wherein the first detection process is based on at least one vehicle-to-vehicle status message from at least one further transportation vehicle wherein vehicle-to-vehicle status message includes information relating to a position and/or a trajectory of the at least one further transportation vehicle,
    wherein the second detection process is based on data generated by an on-board sensor system of the transportation vehicle,
    wherein the third detection process is based on vehicle-to-vehicle messages containing environmental information from the at least one further transportation vehicle, wherein the environmental information is based on sensor recordings of an environment of the at least one further transportation vehicle generated by at least one on-board sensor of the at least one further transportation vehicle,
    wherein the gap identification process wherein the vehicle-to-vehicle messages including environmental information include information that indicates road areas which are occupied by transportation vehicles and free road areas,
    wherein the gap identification process uses the environmental information to construct a virtual field of view or virtual sensor coverage from a combination of sensor data from the on-board sensor system of the transportation vehicle in the second detection process and the sensor data from the at least one further transportation vehicle in the third detection process,
    whereby, the gap identification process is performed for positions which are accessible by viewpoints of sensors of the on-board sensor system of the transportation vehicle and for viewpoints concealed from sensor view points of the on-board sensor system of the transportation vehicle;
  in response to ascertaining that the gap identification process does not identify a gap in traffic, transmit a driving intention message from the at least one transportation vehicle to at least one further transportation vehicle, wherein the driving intention message includes an item of information relating to a future lane change request of the transportation vehicle;
  longitudinally control the transportation vehicle parallel to the identified gap in traffic; and
  laterally control the transportation vehicle by a lane change parallel to the identified gap in traffic.

12. A control system for a transportation vehicle, the control system comprising a control module implemented using at least one computer processor in the transportation vehicle being configured to:
  receive a driving intention message containing a lane change request for a future lane change from a requesting transportation vehicle, wherein the driving intention message comprises an item of information relating to a future lane change request of the transportation vehicle;

ascertain an item of information relating to cooperation in a cooperative driving maneuver with the requesting transportation vehicle based on a merging request required for the lane change request, wherein the ascertained item of information relating to the cooperation indicates whether the transportation vehicle is possible as a cooperation partner and whether a cooperative behavior is possible taking into account a traffic situation based on the received driving intention message;

determining information relating to a driving maneuver by ascertaining information relating to at least one distance to a leading transportation vehicle and/or a trailing transportation vehicle to calculate whether the merging request is able to be complied with in a possible cooperation area, wherein the at least one distance pertains to a gap in traffic required to perform the merging request, wherein the information relating to the cooperative driving maneuver is determined based on information included in the received driving intention message and based on information generated by an on-board sensor system of the transportation vehicle, which both relate to at least one distance, a speed of the transportation vehicle and a distance to the possible cooperation area;

ascertaining the cooperative driving maneuver to be performed based on the information relating to the cooperative driving maneuver;

calculating whether the ascertained cooperative driving maneuver is possible taking into account the traffic situation;

interchanging vehicle-to-vehicle coordination messages for coordinating the cooperative driving maneuver with the at least one further transportation vehicle; and providing driving assistance to perform the cooperative driving maneuver.

* * * * *